United States Patent
Nishikawa

(10) Patent No.: US 6,909,634 B2
(45) Date of Patent: Jun. 21, 2005

(54) MAGNETIC TRANSFER METHOD AND MAGNETIC TRANSFER DEVICE

(75) Inventor: Masakazu Nishikawa, Odawara (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 0 days.

(21) Appl. No.: 10/848,409

(22) Filed: May 19, 2004

(65) Prior Publication Data

US 2004/0233560 A1 Nov. 25, 2004

(30) Foreign Application Priority Data

May 20, 2003 (JP) ........................................ 2003-142056

(51) Int. Cl.[7] .............................................. G11C 11/15
(52) U.S. Cl. .......................... 365/173; 365/232; 365/171
(58) Field of Search ................................. 365/173, 232, 365/171, 158, 199, 51

(56) References Cited

U.S. PATENT DOCUMENTS

2002/0034107 A1 * 3/2002 Saito ........................... 365/200
2002/0075583 A1 6/2002 Ishida et al.
2003/0076611 A1 * 4/2003 Usuki et al. .................... 360/17

FOREIGN PATENT DOCUMENTS

JP 63-183623 A 7/1988

* cited by examiner

Primary Examiner—Richard Elms
Assistant Examiner—Dang Nguyen
(74) Attorney, Agent, or Firm—Sughrue Mion, PLLC

(57) ABSTRACT

In a magnetic transfer master carrier, as a substrate, one having a Young's modulus E (GPa) in the range of 85 to 250 is used. Magnetic transfer is performed under conditions in which $2 \leq \alpha E d^3 / \{P(S2/S1)\} \leq 400$ (where the constant $\alpha = 7.37 \times 10^9$) is satisfied, where d (m) is the thickness of the substrate from the bottom face of a recessed portion to the back face, S1 (m²) is the total area of the cross sections of the projected portions which are parallel to the plane of the substrate at a height of 50% of Dmax from the bottom face of the recessed portion when the height from the bottom face of the recessed portion to the top face of a projected portion is denoted by Dmax, S2 (m²) is the total area of the bottom faces of the recessed portions and the cross sections of the projected portions at the positions of the relevant bottom faces, and P (MPa) is the tight contact pressure between the master carrier and the slave medium at the time of magnetic transfer.

20 Claims, 3 Drawing Sheets

MAGNETIC TRANSFER METHOD AND MAGNETIC TRANSFER DEVICE

BACKGROUND OF THE INVENTION

1. Field of the Invention

The present invention relates to a magnetic transfer method in which a magnetic transfer master carrier having pattern-shaped projections and recesses for transferring information to a magnetic recording medium is used, and a magnetic transfer device equipped with the magnetic transfer master carrier.

2. Description of the Related Art

In general, with the increase in information content, inexpensive media having a large-capacity for recording a large amount of information and preferably providing so-called quick access capable of reading a required point within a short time are desired with regard to a magnetic recording medium. For example, high-density magnetic recording media which are flexible disks such as hard disks or ZIPs (Iomega Corporation) have been known. In these high-density magnetic recording media, information recording areas are constituted of narrow tracks. In order to accurately scan a narrow track width by a magnetic head and reproduce a signal at a high S/N, a so-called tracking servo technology plays an important role.

Servo information including servo signals for track positioning, address signals for the tracks, and reproduction clock signals need to be recorded beforehand as a pre-format on a magnetic recording medium when the magnetic recording medium is fabricated. As a method of accurately and efficiently perform this pre-format, a method of transferring a pattern which is formed in a master carrier and which holds servo information to a magnetic recording medium by magnetic transfer is proposed in, for example, Patent Literatures 1 and 2 and the like.

In magnetic transfer, a magnetic pattern corresponding to an information pattern owned by a master carrier is magnetically transferred to a slave medium by applying a transfer magnetic field in the state where the master carrier holding the information to be transferred is in tight contact with the magnetic recording medium (slave medium) such as a magnetic disk medium. Magnetic transfer has the following advantages: recording can be statically performed without changing the relative positions of the master carrier and the slave medium; accurate pre-format recording can be performed; and the time required for recording is extremely short.

Patent Literature 1

Japanese Unexamined Patent Publication No. 63(1988)-183623

Patent Literature 2

U.S. patent Laid-Open No. 20020075583

In magnetic transfer, how uniformly signal recording can be performed over the entire surface of a disk, and how many slave media can be subjected to magnetic transfer using one master carrier, are very important subjects.

In order to perform uniform signal recording, a tight contact pressure is required up to such a degree that the master carrier and the slave medium can be uniformly brought into tight contact with each other over the entire surfaces. Meanwhile, according to research by the present inventors, it has become clear that the deformation of the master carrier and pattern breakage tend to occur as this tight contact pressure increases. Moreover, it has also become clear that the occurrence of the deformation of the master carrier and pattern breakage depends not only on the tight contact pressure but also on elastic characteristics of a substrate of the master carrier, the thickness of the substrate, the pattern area and layout, and the like.

Therefore, in order to realize uniform signal recording and magnetic transfer to more slave media, it is considered to be necessary that a substrate thickness, pattern area and layout, and the like be designed by taking elastic characteristics of the substrate of the master carrier into consideration, and that the setting of the tight contact pressure between the master carrier and the slave medium be optimized.

SUMMARY OF THE INVENTION

In light of the above-described circumstances, an object of the present invention is to provide a magnetic transfer method and a magnetic transfer device which enable magnetic transfer to be performed onto more slave media using one magnetic transfer master carrier and in which favorable transferred signals can be obtained in slave media after the magnetic transfer.

A magnetic transfer method of the present invention is a magnetic transfer method of transferring information to a flat recording medium having a magnetic layer by applying a magnetic field to the recording medium and a magnetic transfer master carrier including a substrate having a projected/recessed pattern on a surface thereof, the projected/recessed pattern being formed in accordance with the information to be transferred to the recording medium, in a state where the recording medium and the master carrier are in tight contact with each other with a predetermined pressure, wherein the substrate of the master carrier has a Young's modulus E (GPa) of 85 to 250, and an expression $2 \leq \alpha E d^3/\{P(S2/S1)\} \leq 400$ (where the constant $\alpha = 7.37 \times 10^9$) is satisfied, where d (m) is a thickness of the substrate of the master carrier from a bottom face of a recessed portion to a back face, S1 (m$^2$) is a total area of cross sections of projected portions which are parallel to a plane of the substrate at a height of 50% of Dmax from the bottom face of the recessed portion when a height from the bottom face of the recessed portion to a top face of a projected portion is denoted by Dmax, S2 (m$^2$) is a total area of bottom faces of recessed portions and cross sections of the projected portions at a position of the relevant bottom faces, and P (MPa) is the predetermined pressure.

The Young's modulus is more preferably 150 to 230 GPa, and $\alpha E d^3/\{P(S2/S1)\}$ is more preferably 150 to 350.

Moreover, the predetermined pressure P is preferably 0.05 to 9.0 MPa, and more preferably 0.06 to 7.0 MPa.

A magnetic transfer device of the present invention is a magnetic transfer device comprising:

a magnetic transfer master carrier including a substrate having a projected/recessed pattern on a surface thereof, the projected/recessed pattern being formed in accordance with information to be transferred to a recording medium;

tight contact means for bringing the magnetic transfer master carrier and the recording medium into tight contact with each other with a predetermined pressure; and magnetic field application means for applying a magnetic field to the recording medium and the master carrier, which have been brought into tight contact with each other by the tight contact means, and transferring the information to the recording medium, wherein the substrate of the master carrier has a Young's modulus E (GPa) of 85 to 250, and an expression
$2 \leq \alpha E d^3/\{P(S2/S1)\} \leq 400$ (where the constant $\alpha=7.37\times 10^9$) is satisfied, where d (m) is a thickness of the substrate from a bottom face of a recessed portion to a back face, S1 (m²) is a total area of cross sections of projected portions which are parallel to a plane of the substrate at a height of 50% of Dmax from the bottom face of the recessed portion when a height from the bottom face of the recessed portion to a top face of a projected portion is denoted by Dmax, S2 (m²) is a total area of bottom faces of recessed portions and cross sections of the projected portions at a position of the relevant bottom faces, and P (MPa) is the predetermined pressure.

It is possible to use as the tight contact means, for example, means for applying pressure to the master carrier and the recording medium by decompressing a holder which houses the master carrier and the recording medium and which brings the master carrier and the recording medium into tight contact with each other, and/or means for applying pressure to the master carrier and the recording medium by load pressing.

Note that, in the aforementioned magnetic transfer device, it is desirable that the master carrier has a ratio S2/S1 between the total areas S1 and S2 in a range of 2 to 100. Moreover, it is desirable that the master carrier has the thickness d in a range of 0.05 to 0.71 mm. Furthermore, it is desirable that, in the master carrier, the substrate is made of any one of Ni and alloy containing Ni as a main component.

Note that the information to be transferred includes, for example, servo signals.

In a magnetic transfer method of the present invention, a master carrier including a substrate having a Young's modulus E (GPa) of 85 to 250 is used, and an expression $2 \leq \alpha E d^3/\{P(S2/S1)\} \leq 400$ (where the constant $\alpha=7.37\times 10^9$) is satisfied, where d (m) is a thickness of the substrate of the master carrier from a bottom face of a recessed portion to a back face, S1 (m²) is a total area of cross sections of projected portions which are parallel to a plane of the substrate at a height of 50% of Dmax from the bottom face of the recessed portion when a height from the bottom face of the recessed portion to a top face of a projected portion is denoted by Dmax, S2 (m²) is a total area of bottom faces of recessed portions and cross sections of the projected portions at a position of the relevant bottom faces, and P is a tight contact pressure between the master carrier and a recording medium. Accordingly, the master carrier and the recording medium can be uniformly brought into tight contact with each other over the entire surfaces, and the deformation of the master carrier and pattern breakage can be suppressed.

A magnetic transfer device of the present invention is equipped with a master carrier including a substrate having a Young's modulus E (GPa) of 85 to250. In the magnetic transfer device of the present invention, an expression $2 \leq \alpha E d^3/\{P(S2/S1)\} \leq 400$ (where the constant $\alpha=7.37\times 10^9$) is satisfied, where d (m) is a thickness of the substrate of the master carrier from a bottom face of a recessed portion to a back face, S1 (m²) is a total area of cross sections of projected portions which are parallel to a plane of the substrate at a height of 50% of Dmax from the bottom face of the recessed portion when a height from the bottom face of the recessed portion to a top face of a projected portion is denoted by Dmax, S2 (m²) is a total area of bottom faces of recessed portions and cross sections of the projected portions at a position of the relevant bottom faces, and P is a tight contact pressure between the master carrier and a recording medium by the tight contact means. Accordingly, the master carrier and the recording medium can be uniformly brought into tight contact with each other over the entire surfaces, and the deformation of the master carrier and pattern breakage can be suppressed.

The present inventors have found the following fact: in the case where $\alpha E d^3/\{P(S2/S1)\}$ is smaller than 2, there is a problem that a local tight contact pressure between a master carrier and a slave medium becomes too large and that pattern breakage tends to occur; in the case where $\alpha E d^3/\{P(S2/S1)\}$ is larger than 400, there is a problem that the tight contact between them is insufficient and that uniform signal transfer over the entire surfaces is not performed. Meanwhile, the present inventors have found the following fact: in the case where $2 \leq \alpha E d^3/\{P(S2/S1)\} \leq 400$, a favorable magnetization pattern can be formed on the recording medium because the master carrier and the recording medium can be uniformly brought into tight contact with each other over the entire surfaces, and magnetic transfer to more recording media can be performed by the same master carrier than heretofore to improve a yield because the deformation of the master carrier and pattern breakage can be suppressed.

Thus, reproduced signals of high quality can be obtained from a recording medium in which a favorable magnetization pattern is formed. Moreover, due to the improvement in a yield, a recording medium having a high signal quality can be inexpensively provided.

Note that, in the magnetic transfer device of the present invention, the durability of the master carrier when pressure is applied can be improved and transfer quality can be improved by adopting, as the substrate of the magnetic transfer master carrier, one which has S1S2 in the range of 2 to 100 and a thickness d in the range of 0.05 to 0.71 mm and/or which is made of Ni or Ni alloy.

DESCRIPTION OF THE PREFERRED EMBODIMENT

Hereinafter, an embodiment of the present invention will be described in detail using the drawings.

Figure 1:
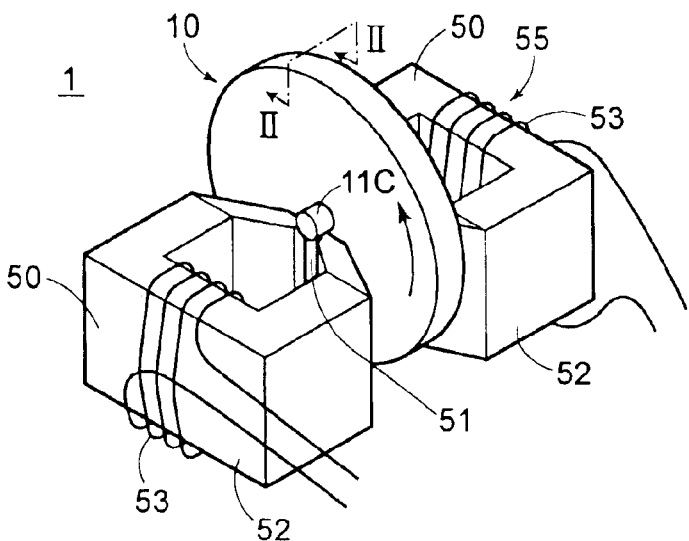
FIG. 1 is a perspective view showing a schematic configuration of a magnetic transfer device.
Figure 2:
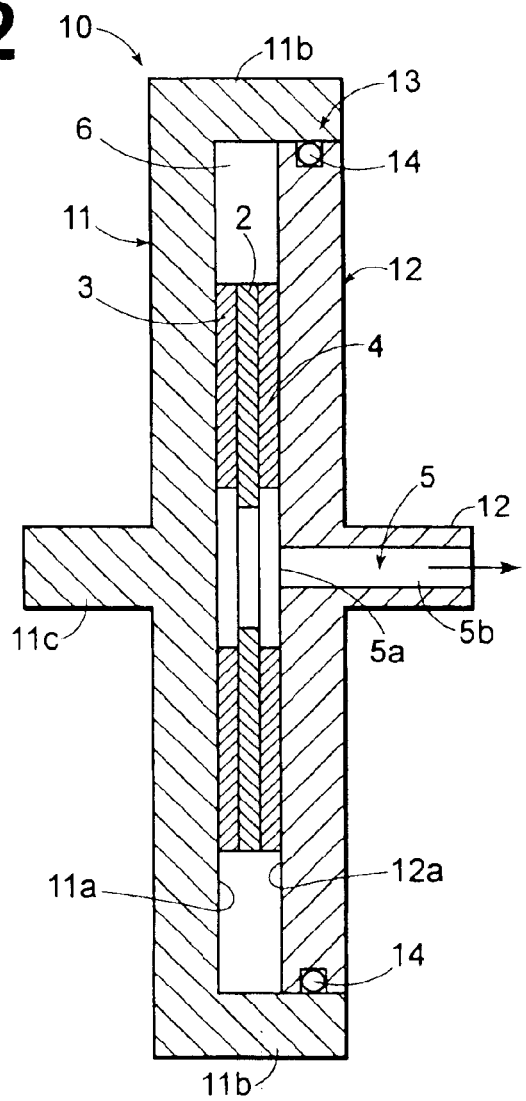
FIG. 2 is a cross-sectional view of a transfer holder of the magnetic transfer device shown in FIG. 1.
Figure 3:
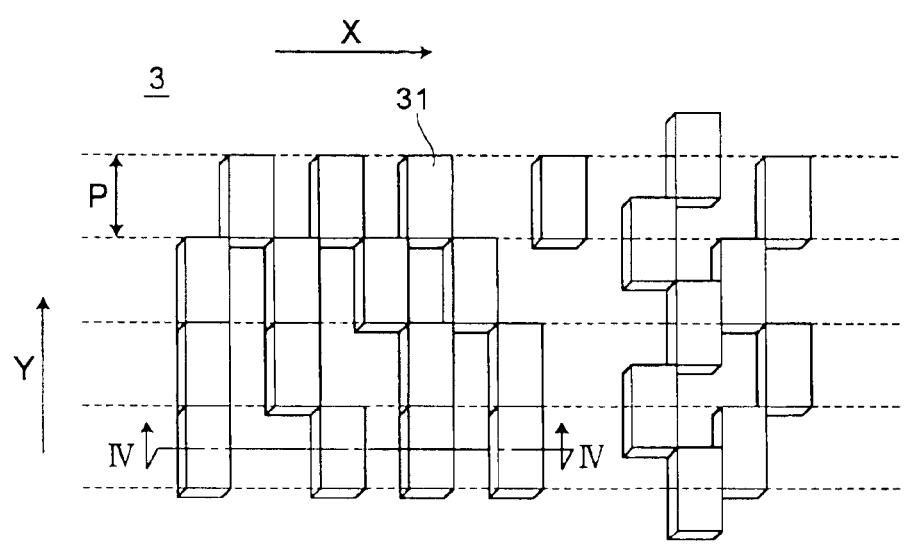
FIG. 3 is a partial perspective view of the surface of a magnetic transfer master carrier.
Figure 4:
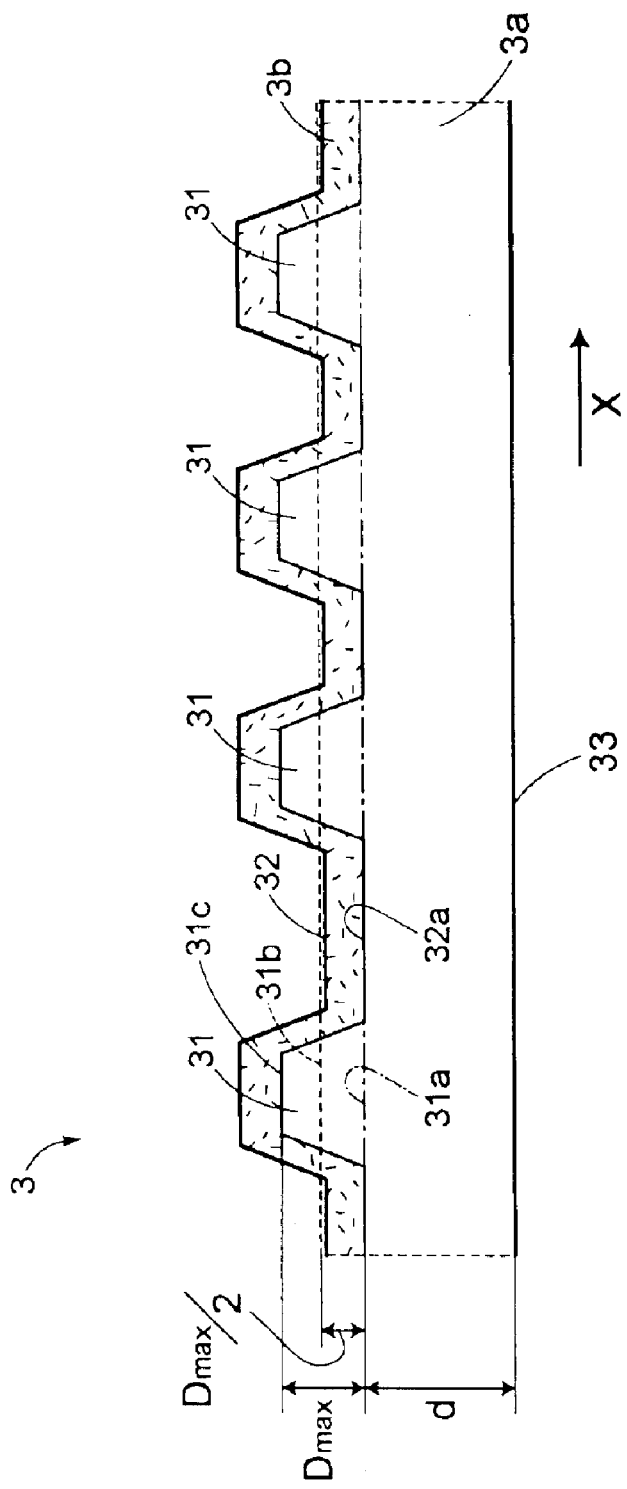
FIG. 4 is a cross-sectional view of the magnetic transfer master carrier of FIG. 3.

FIG. 1 is a perspective view showing a schematic configuration of an embodiment of a magnetic transfer device of the present invention. FIG. 2 is the II—II cross-sectional view of a transfer holder shown in FIG. 1. FIGS. 3 and 4 are views for explaining a magnetic transfer master carrier included in the magnetic transfer device of the present invention. Note that each drawing is a schematic view and that the dimensions of respective portions are shown at different ratios from the actual ones.

The magnetic transfer device 1 includes master carriers 3 and 4, tight contact means including a transfer holder 10 which brings the master carrier 3 and a slave medium 2 into tight contact with each other and holds the master carrier 3 and the slave medium 2 and vacuum suction means (not shown) for vacuum suctioning the air in the inner space of the transfer holder 10 to set the inside to a decompressed state and obtaining tight contact power, and magnetic field application means 55 for applying a transfer magnetic field while rotating the transfer holder 10.

The magnetic field application means 55 includes electromagnet devices 50 arranged on both sides of the transfer holder 10, and is formed by winding coils 53 around cores 52 of the electromagnet devices 50 which have gaps 51 extending in the radial direction of the transfer holder 10. Both electromagnet devices 50 are for generating a magnetic field in the direction parallel to the track direction and in the same orientation as that of the track direction. Alternatively, the magnetic field application means 55 may include permanent magnet devices instead of the electromagnet devices. Note that the above-described magnetic field application means 55 is for in-plane recording. However, magnetic field application means in the case of perpendicular recording can include electromagnets or permanent magnets which are arranged on both sides of the transfer holder 10 and have different polarities. That is, in the case of perpendicular recording, a transfer magnetic field is generated in the direction perpendicular to the track direction.

Moreover, in the magnetic field application means 55, the electromagnet devices 50 on both sides of the transfer holder 10 move to approach or leave each other in order to allow opening and closing motions of the transfer holder 10, or the electromagnet devices 50 or the holder 10 moves such that the transfer holder 10 is inserted between the electromagnet devices 50.

The transfer holder 10 includes a "one side" holder 11 on the left and an "other side" holder 12 on the right which can relatively move to approach or leave each other, contains the slave medium 2 and the master carriers 3 and 4 on both sides thereof in the inner space 6 hermetically formed by a circumferential sealing mechanism 13 with the approach of the "one side" and "other side" holders, and superimposes the slave medium 2 on the master carriers 3 and 4 in the state where the centers are aligned, thus bringing the slave medium 2 and the master carriers 3 and 4 into tight contact with each other by decompressing the inner space 6 so that the slave medium 2 and the master carriers 3 and 4 may be mutually opposite.

On a reference pressing inner surface 11a of the "one side" holder 11, one master carrier 3 for transferring information, such as servo signals, to one side of the slave medium 2 and the slave medium 2 are held. On a pressing inner surface 12a of the "other side" holder 12, the other master carrier 4 for transferring information, such as servo signals, to the other side of the slave medium 2 is held.

In other words, the "one side" holder 11 of the transfer holder 10 is disk-shaped, has the circular inner surface 11a having a diameter larger than the outside diameters of the master carriers 3 and 4, holds the back face of one master carrier 3 at the central portion of this inner surface 11a by suction or the like, and holds the slave medium 2 on the surface of this master carrier 3 by vacuum or the like. The "other side" holder 12 is disk-shaped, similarly has a circular inner surface 12a with a diameter larger than the outside diameters of the master carriers 3 and 4, and holds the back face of the other master carrier 4 at the central portion of this inner surface 12a by vacuum or the like.

The sealing mechanism 13 for connecting two components of the "one side" and "other side" holders 11 and 12 includes a collar portion 11b protruding in the axial direction on the circumference of the "one side" holder 11, and a sealing member 14 of an O ring attached to the outer circumferential surface of the "other side" holder 12. The outside diameter of the "other side" holder 12 is smaller than the diameter of the inner circumferential surface of the collar portion 11b of the "one side" holder 11. The "other side" holder 12 is provided within the inner circumference of the collar portion 11b of the "one side" holder 11 such that the "other side" holder 12 can be inserted into the collar portion 11b of the "one side" holder 11. When the "other side" holder 12 is moved toward the "one side" holder 11, the sealing member 14 on the outer circumferential surface of the "other side" holder 12 comes into contact with the inner circumferential surface of the collar portion 11b of the "one side" holder 11 in a sliding manner to hermetically seal the inner space 6 while allowing relative displacement.

At the central portions of the back faces of the "one side" and "other side" holders 11 and 12, center shafts 11c and 12c are respectively provided in a protruding manner and supported by the device main body. The "one side" and "other side" holders 11 and 12 are linked to a rotating mechanism (not shown) and integrally driven to be rotated about the center shafts 11c and 12c at the time of magnetic transfer.

Moreover, in order to decompress the inner space 6, the transfer holder 10 includes a suction port 5a opening at the central portion of the pressing inner surface 12a of the "other side" holder 12, and an air passage 5b which communicates with this suction port 5a and leads air to the outside through the center shaft 12c of the "other side" holder 12.

The inner space 6 formed by the "other side" and "one side" holders 12 and 11 is decompressed to a predetermined degree of vacuum by vacuum suction by the vacuum suction means (not shown). Thus, pressure is applied to the slave medium 2 and the master carriers 3 and 4 which are superimposed on each other, and a predetermined tight contact pressure P (MPa) is obtained.

Further, the magnitude of the applied pressure due to this decompression can be set to an arbitrary magnitude by arbitrarily setting the radial position of the connection sealing portion between the "one side" and "other side" holders 11 and 12 of the transfer holder 10, which relatively move, to change the decompression area. That is, predetermined tight contact power corresponding to the degree of vacuum is obtained by changing the ratio of the area (outside diameter of the "other side" holder 12) of the vacuum suction region of the transfer holder 10 to the contact area between the slave medium 2 and the master carriers 3 and 4.

The tight contact pressure is preferably 0.05 to 9.0 MPa, and more preferably 0.06 to 7.0 MPa.

Next, a magnetic transfer method using the above-described magnetic transfer device 1 will be described. First, the magnetization of the slave medium 2 is set in advance to an initial DC magnetization in the in-plane track direction in the case of in-plane recording or in the perpendicular direction in the case of perpendicular recording. This slave medium 2 is brought into tight contact with the master carriers 3 and 4, and the transfer magnetic field is applied in the track direction or the perpendicular direction which is approximately opposite to the orientation of the initial DC magnetization to perform magnetic transfer.

In the transfer holder 10 of the aforementioned magnetic transfer device, magnetic transfer is performed on a plurality of slave media 2 using the same master carriers 3 and 4. First, the master carriers 3 and 4 are aligned and held on the "one side" and "other side" holders 11 and 12. Then, after a slave medium 2 initially magnetized in one of the in-plane direction and the perpendicular direction in advance is set while the center position is being aligned in an open state in which the "one side" and "other side" holders 11 and 12 are separated, the "other side" holder 12 is moved to approach the "one side" holder 11.

Then, the sealing member 14 of the "other side" holder 12 comes into contact with the inner circumferential surface of the collar portion 11b of the "one side" holder 11 in a sliding manner to hermetically seal the inner space 6 of the transfer holder 10 containing the slave medium 2 and the master carriers 3 and 4. Decompression is performed by vacuum suctioning the air in the inner space 6 through the air passage 5b using the vacuum suction means, and the inside is set to a predetermined degree of vacuum. The "other side" and "one side" holders 12 and 11 relatively move, thereby applying pressure to the slave medium 2 and the master carriers 3 and 4, which are superimposed on each other. Thus, the "other side" holder 12 applies tight contact power to the slave medium 2 and the master carrier 3 in the direction toward the "one side" holder 11 with the pressure of external force (atmospheric pressure) which acts in accordance with the degree of vacuum, and brings the slave medium 2 and the master carrier 3 into tight contact with each other with a predetermined tight contact pressure P (MPa) to be described later. In addition, the air between the tight contact surfaces of the two is evacuated, and tight contact is improved.

Thereafter, the magnetic field application device is brought close to both sides of the transfer holder 10, and the transfer magnetic field is applied in an orientation approximately opposite to that of the initial magnetization using the magnetic field application device while the transfer holder 10 is being rotated, thus transferring and recording magnetization patterns corresponding to transfer patterns of the master carriers 3 and 4 on a magnetic recording section of the slave medium 2.

The transfer magnetic field applied at the time of the above-described magnetic transfer is absorbed by projected portion patterns of magnetic material, which are in tight contact with the slave medium 2, in the transfer patterns of the master carriers 3 and 4. In the case of in-plane recording, the initial magnetization in these portions is not reversed, but the initial magnetization in the other portions is reversed. In the case of perpendicular recording, the initial magnetization in these portions is reversed, but the initial magnetization in the other portions is not reversed. As a result, the magnetization patterns corresponding to the transfer patterns of the master carriers 3 and 4 are transferred and recorded on the slave medium 2.

Moreover, in addition to the application of pressure by the decompression of the inner space 6 of the transfer holder 10, the mechanical application of pressure using a power source from the outside to the holder 10 may be used in combination therewith. Pressing means for this mechanical application of pressure can be constituted, for example, such that the pressing means includes a pressure cylinder and that the tip of a pressing rod thereof applies a predetermined pressing load to the center shaft 11c or 12c of the holder 10. Also in this case, in total, the tight contact pressure between the master carriers 3 and 4 and the slave medium 2 is set to the predetermined tight contact pressure P to be described later.

Next, a magnetic transfer master carrier of the present magnetic transfer device will be described. FIG. 3 is a partial perspective view of the surface of the magnetic transfer master carrier 3 included in the magnetic transfer device of the present embodiment. In FIG. 3, the arrow X indicates the circumferential direction (track direction), and the arrow Y indicates the radial direction.

The master carrier 3 is disk-shaped as described previously, and includes a substrate 3a having a projected/recessed pattern formed on the surface thereof in accordance with signals and a magnetic layer 3b formed along the projected/recessed pattern. Note that the magnetic layer 3b need only be formed on at least the projected portions of the projected/recessed pattern and need not be formed on the recessed portions. Moreover, if the substrate is a substrate of magnetic material, the magnetic layer need not necessarily be included therein. The projected/recessed pattern corresponds to information to be transferred to a magnetic recording medium, which is the slave medium, and part of the pattern is, for example, as shown in FIG. 3. The information to be transferred is, for example, servo signals, but may include other various data.

FIG. 4 shows the IV—IV cross-sectional view of the master carrier 3 shown in FIG. 3. That is, it is the cross-sectional view of the substrate 3a taken along a plane perpendicular to the substrate 3a and parallel to the track direction X. In the master carrier 3 of the present invention, the substrate thereof 3a has a Young's modulus E (GPa) in the range of 85 to 250. Further, the total areas S1 and S2, thickness d, and Young's modulus E of the master carrier and the tight contact pressure P are set such that Expression (1) is satisfied, $$2 \leq \alpha E d^3 / \{P(S2/S1)\} \leq 400 \text{ (where the constant } \alpha = 7.37 \times 10^9) \quad (1)$$

where d (m) is the thickness of the substrate 3a from the bottom face 32a of a recessed portion 32 to the back face 33, S1 ($m^2$) is the total area of the cross sections 31b of the projected portions 31 which are parallel to the plane of the substrate 3a at a height (position indicated by a dotted line in this drawing) of 50% of Dmax from the bottom face 32a of the recessed portion 32 when the height from the bottom face 32a of the recessed portion 32 to the top face 31c of a projected portion 31 is denoted by Dmax, S2 ($m^2$) is the total area of the bottom faces 32a of the recessed portions 32 and the cross sections 31a of the projected portions 31 at the positions of the relevant bottom faces, and P (MPa) is the tight contact pressure between the master carrier 3 and the slave medium 2 at the time of magnetic transfer. Note that it is particularly desirable to constitute the master carrier such that the ratio S2/S1 between the total areas S1 and S2 falls in the range of 2 to 100 and that the thickness d becomes a value in the range of 0.05 to 0.71 mm.

As the substrate 3a of the master carrier 3, one made of Ni, silicon, a quartz plate, glass, aluminum, ceramics, synthetic resin, or the like can be used, but one made of Ni or one made of alloy containing Ni as a main component is particularly preferable. Moreover, as the magnetic material for the magnetic layer 3b, Co, a Co alloy (CoNi, CoNiZr, CoNbTaZr, or the like), Fe, a Fe alloy (FeCo, FeCoNi, FeNiMo, FeAlSi, FeAl, or FeTaN), Ni, or a Ni alloy (NiFe) can be used, and particularly preferable ones are FeCo and FeCoNi. Note that better transfer can be performed by using, as the magnetic layer 3b provided on the substrate 3a, a magnetic layer of soft magnetic material, semi-hard magnetic material, or the like having a small coercive force. Furthermore, the magnetic layer 3b preferably has a saturation magnetization value higher than that of the saturation magnetization of the substrate 3a.

The preparation of the substrate 3a having the projected/recessed pattern on the surface thereof can be performed by use of stamping, photolithography, or the like.

The outline of a method of preparing the substrate 3a will be described. First, photoresist is formed on a glass plate (or quartz plate) having a smooth surface by spin coating or the like. This glass plate is irradiated with laser light (or electron beam) modulated in accordance with servo signals while being rotated, and a predetermined pattern is exposed on the entire surface of the photoresist, e.g., a pattern corresponding to the servo signals which linearly extends in the radial direction from the rotation center to each track is exposed to a portion corresponding to each frame on the circumference. Then, the photoresist is developed, and exposed portions are removed, thus obtaining a master having a projected/recessed shape of the photoresist. Next, based on the projected/recessed pattern on the surface of the master, plating (electroforming) is performed on this surface to prepare a Ni substrate having a positive projected/recessed pattern, and the Ni substrate is removed from the master. This substrate is used as a master carrier without modification or used as a master carrier after a magnetic layer and a protective film are coated on the projected/recessed pattern as needed.

Alternatively, a substrate having a negative projected/recessed pattern may be prepared by plating the master to prepare a second master and performing plating by use of this second master. Furthermore, a substrate having a positive projected/recessed pattern may be prepared as follows: a third master is prepared by plating the second master or pressing a resin solution to the second master to perform curing, and the third master is plated.

In contrast, after the pattern of the photoresist has been formed on the glass plate, a substrate may be formed as follows: holes are formed in the glass plate by etching, a master from which the photoresist has been removed is obtained, and then the same as described previously is performed.

As a material for the substrate of metal, as described previously, Ni, alloy containing Ni as a main component, or the like can be used. As the plating for preparing this substrate, various kinds of metal deposition methods including electroless plating, electroforming, sputtering, or ion plating can be adopted. The height of a projected portion of the substrate (depth of the projected/recessed pattern) is preferably in the range of 50 to 800 nm, more preferably in the range of 80 to 600 nm. In the case where this projected/recessed pattern corresponds to sample servo signals, rectangular projected portions which are longer in the radial direction than in the circumferential direction are formed. Specifically, the length in the radial direction is preferably 0.05 to 20 $\mu$m, and the length in the circumferential direction is preferably 0.05 to 5 $\mu$m. For a pattern that holds information on servo signals, it is preferable that values to form shapes longer in the radial direction be selected in the above ranges.

The formation of the magnetic layer 3$b$ on the projected/recessed pattern of the substrate is performed by vacuum deposition means, such as vacuum deposition, sputtering or ion plating, or the plating method using magnetic material. The thickness of the magnetic layer (thickness of the magnetic layer on the top face of a projected portion) is preferably in the range of 50 to 500 nm, and more preferably in the range of 80 to 300 nm.

Note that it is preferable that a protective film of diamond-like carbon (DLC) or the like of 5 to 30 nm be provided on the magnetic layer on the surface of the projected portion.

Further, a lubricant layer may be provided. Moreover, a tight contact reinforcing layer of Si or the like may be provided between the magnetic layer and the protective layer. Providing lubricant makes it possible to suppress the occurrence and the like of a scratch due to friction when displacement caused in a contact process with a slave medium is corrected, and to improve durability more.

As the slave medium 2, a disk-shaped magnetic recording medium, such as a hard disk having a rigid non-magnetic substrate made by, for example, glass or aluminum, or a flexible disk having a flexible plastic substrate with a particulate magnetic recording layer comprising a ferromagnetic powder and a binder or a thin film metal magnetic recording layer can be used.

Note that in the case of a magnetic recording medium having a metal-thin-film-type magnetic recording layer, as magnetic material, Co, Co alloy (CoPtCr, CoCr, CoPtCrTa, CoPtCrNbTa, CoCrB, CoNi, Co/Pd, or the like), Fe, or Fe alloy (FeCo, FePt, or FeCoNi) can be used. The magnetic layer preferably has a large magnetic flux density and magnetic anisotropy in the in-plane direction in the case of in-plane recording or in the perpendicular direction in the case of perpendicular recording because clear transfer can be performed. A preferable thickness of the magnetic layer is equal to or larger than 10 nm and equal to or smaller than 500 nm, more preferably equal to or larger than 20 nm and equal to or smaller than 200 nm.

Moreover, it is preferable that a nonmagnetic underlying layer be provided under the magnetic layer (closer to the substrate) in order to give necessary magnetic anisotropy to the magnetic layer. For the underlying layer, Cr, CrTi, CoCr, CrTa, CrMo, NiAl, Ru, Pd, or the like can be used. However, one having a crystal structure and a lattice constant matching those of the magnetic layer provided thereon needs to be selected. A preferable thickness of the nonmagnetic layer is equal to or larger than 10 nm and equal to or smaller than 150 nm, more preferably equal to or larger than 20 nm and equal to or smaller than 80 nm.

Furthermore, in the case of a perpendicular magnetic recording medium, a soft magnetic backing layer may be provided under the nonmagnetic underlying layer in order to stabilize the state of perpendicular magnetization of the magnetic layer and to improve sensitivity at the time of recording and reproduction. For this backing layer, NiFe, CoCr, FeTaC, FeAlSi, or the like can be used. A preferable thickness of the backing layer is equal to or larger than 50 nm and equal to or smaller than 2000 nm, and more preferably equal to or larger than 60 nm and equal to or smaller than 400 nm.

EXAMPLES

Next, the results of performing magnetic transfer by use of magnetic transfer devices and methods of examples and comparative examples of the present invention and evaluating the quality of transferred signals and the durability of master carriers will be described. In the magnetic transfer devices of Examples 1 to 8 and Comparative Examples 1 to 3, conditions including the elastic modulus and dimensions of a master carrier, the tight contact pressure between a master carrier and a slave medium are different from each other.

The master carrier of the magnetic transfer device of Example 1 includes as a substrate a disk-shaped Ni substrate prepared using a method of preparing a stamper. In the Ni substrate, projected/recessed pattern signals in which the track width was 0.3 μm, the bit length was 0.15 μm at a position of 20 mm in the radial direction, i.e., at the innermost circumference, and the height of a projected portion (depth of a groove in a recessed portion) was 0.1 μm, were formed in the region between 20 and 40 mm from the center of the disk in the radial direction. The Young's modulus E of the Ni substrate was 170 GPa. In the present Example 1, the thickness d of the substrate from the bottom face of a recessed portion to the back face was set at 0.3 mm, and the ratio S2/S1 was set at 6.7 in the case where S1 ($m^2$) is the total area of the cross sections of the projected portions which are parallel to the plane of the substrate $3a$ at a height of 50% of Dmax from the bottom face of a recessed portion when the height from the bottom face of the recessed portion of the substrate to the top face of a projected portion thereof is denoted by Dmax, and where S2 ($m^2$) is the total area of the bottom faces of the recessed portions of the substrate and the cross sections of the projected portions at the positions of the relevant bottom faces.

On this Ni substrate, an intermediate layer and a magnetic layer of FeCo 30 at % having a thickness of 100 nm were stacked. Both the intermediate layer and the magnetic layer were made at a substrate temperature of 25° C. The intermediate layer and the magnetic layer were sequentially formed in a vacuum deposition system (Shibaura Mechatronics Corporation: the sputtering equipment Octava). The magnetic layer was formed by setting the Ar sputtering pressure at $1.44 \times 10^{-1}$ Pa (1.08 mTorr) under the condition that the input power was 2.80 W/$cm^2$ in the state where the atmosphere was decompressed to $1.33 \times 10^{-5}$ Pa ($10^{-7}$ Torr).

As a slave medium, a 3.5-inch disk-shaped magnetic recording medium having a magnetic layer with a saturation magnetization Ms of 5.7 T (4500 Gauss) and a coercive force Hc of 199 kA/m (2500 Oe) was used.

The tight contact pressure P between the master carrier and the slave medium at the time of magnetic transfer was set at 0.4 MPa (4.0 kgf/$cm^2$). Therefore, $\alpha E d^3 / \{P(S2/S1)\} = 12.6$ in the present Example 1. Note that $\alpha E d^3 / \{P(S2/S1)\}$ is hereinafter referred to as GSP value. It should be noted that the relationship between an external force and a pressure was obtained in advance using a pressure gauge, such as Prescale, and that the tight contact pressure was obtained based on the relationship.

In Example 2, the same magnetic transfer device and method as those of Example 1 were adopted except that the tight contact pressure P between the master carrier and the slave medium at the time of magnetic transfer was set at 0.1 MPa. In this case, the GSP value was 50.5.

In Example 3, the same magnetic transfer device and method as those of Example 1 were adopted except that, as a substrate of a master carrier, a Si substrate in which a projected/recessed pattern was made using photolithography technology was used. The Young's modulus E of the Si substrate was 100 GPa. In the present example, the GSP value was 7.4.

In Example 4, the same magnetic transfer device and method as those of Example 1 were adopted except that the tight contact pressure was set at 0.04 MPa. In the present example, the GSP value was 126.2.

In Example 5, the same magnetic transfer device and method as those of Example 1 were adopted except that the tight contact pressure was set at 1.2 MPa. In the present example, the GSP value was 4.2.

In Example 6, the same magnetic transfer device and method as those of Example 1 were adopted except that the thickness d of a substrate of a master carrier was set at 0.1 mm, S2/S1 was set at 3.2, and the tight contact pressure was set at 0.2 MPa. In the present example, the GSP value was 2.0.

In Example 7, the same magnetic transfer device and method as those of Example 1 were adopted except that the thickness d of a substrate of a master carrier was set at 0.8 mm and the tight contact pressure was set at 0.7 MPa. In the present example, the GSP value was 136.8.

In Example 8, the same magnetic transfer device and method as those of Example 1 were adopted except that S2/S1 was set at 1.0.

In Comparative Example 1, the same magnetic transfer device and method as those of Example 1 were adopted except that the thickness d of a substrate of a master carrier was set at 0.1 mm. In the present comparative example, the GSP value was 0.5.

In Comparative Example 2, the same magnetic transfer device and method as those of Example 1 were adopted except that an Al substrate was used as a substrate of a master carrier. The Young's modulus E of the Al substrate was 70 GPa. In the present comparative example, the GSP value was 5.2.

In Comparative Example 3, the same magnetic transfer device and method as those of Example 1 were adopted except that the thickness d of a substrate of a master carrier was set at 0.05 mm. In the present comparative example, the GSP value was 0.1.

Using the magnetic transfer device and method of each of Examples 1 to 8 and Comparative Examples 1 to 3, magnetic transfer was performed on 10000 slave media, and the following measurement and evaluation were performed.

<Method of measuring and evaluating points of transfer failures>

Points of transfer failures of the slave media were measured using an electromagnetic characteristic measurement apparatus (SS-60 manufactured by Kyodo Denshi System Co., Ltd.). As a head, a GMR head in which a reproducing head gap is 0.12 μm, a reproducing track width is 0.6 μm, a recording head gap is 0.18 μm, and a recording track width is 0.75 μm, was used.

For the 1st, 10th, 100th, 1000th, and 10000th slave media out of the 10000 slave media subjected to magnetic transfer, an envelope for one lap was measured for each 0.5 mm in the region in which the radius is 20.0 to 40.0 mm, and a reproduction output map having axes of the radial position and the angle was created.

For each of the 1st, 10th, 100th, 1000th, and 10000th slave media, the average output of the output map was regarded as 100%, and binarization was performed such that zero is set for points having reproduction output equal to or less than 70% and that one is set for the other points. The ratio (%) of the zero value area to the entire area of the measured region in the output map after this binarization was found. The respective results of the examples and the comparative examples are shown in Table 1

TABLE 1

|  | Young's modules E (GPa) | GSP value | Tight contact pressure P (MPa) | S2/S1 | Thickness d (×10⁻³ m) | Number of slaves/Points of transfer failures (%) | | | | | Evaluation |
|---|---|---|---|---|---|---|---|---|---|---|---|
|  |  |  |  |  |  | 1 slave | 10 slaves | 100 slaves | 1000 slaves | 10000 slaves |  |
| Example 1 | 170 | 12.6 | 0.4 | 6.7 | 0.3 | 0.1 | 0 | 0.2 | 0 | 0.3 | ○ |
| Example 2 | 170 | 50.5 | 0.1 | 6.7 | 0.3 | 0 | 0.1 | 0.1 | 0.1 | 0.1 | ○ |
| Example 3 | 100 | 7.4 | 0.4 | 6.7 | 0.3 | 0.1 | 0.2 | 0.2 | 0.1 | 0.2 | ○ |
| Example 4 | 170 | 126.2 | 0.04 | 6.7 | 0.3 | 0.2 | 0.1 | 0.1 | 0.3 | 0.6 | Δ |
| Example 5 | 170 | 4.2 | 1.2 | 6.7 | 0.3 | 0.1 | 1.9 | 1.1 | 1.7 | 1.2 | Δ |
| Example 6 | 170 | 2.0 | 0.2 | 3.2 | 0.1 | 0 | 0.2 | 0.3 | 0.6 | 1.1 | Δ |
| Example 7 | 170 | 136.8 | 0.7 | 3.7 | 0.8 | 0.3 | 0.2 | 0.3 | 1.4 | 2.2 | Δ |
| Example 8 | 170 | 84.6 | 0.4 | 1.0 | 0.3 | 0.1 | 0.3 | 1.9 | 2.2 | 2.6 | Δ |
| Comparative Example 1 | 170 | 0.5 | 0.4 | 6.7 | 0.1 | 0.8 | 0.7 | 0.6 | 2.7 | 3.6 | X |
| Comparative Example 2 | 70 | 5.2 | 0.4 | 6.7 | 0.3 | 0.2 | 0.7 | 1.1 | 2.2 | 3.4 | X |
| Comparative Example 3 | 170 | 0.1 | 0.4 | 6.7 | 0.05 | 0.8 | 1.5 | 5.0 | 16 | 23 | X |

Note that each of the examples and the comparative examples was rated as favorable (circle) if the ratios of the zero value areas are equal to or less than 0.5% in all of the 1st, 10th, 100th, 1000th, and 10000th slave media, rated as fair (triangle) if the ratio is larger than 0.5% and smaller than 3% in any of the above slave media, and rated as defective (cross) if the ratio is equal to or larger than 3% in any of the above slave media.

As shown in Table 1, in the case where the Young's modulus of a master carrier falls in the range of 85 to 250 GPa and the GSP value falls in the range of 2 to 400 as in Examples 1 to 8, the ratio of the zero value area was very small in any of the 1st, 10th, 100th, 1000th, and 10000th slave media, change due to the increase in the number thereof was also small, and a rating of "fair" or better was obtained. That is, it is considered that uniform signal transfer is performed over the entire surface, and that the deformation of the master carrier and pattern breakage hardly occur even if transfer is repeated. On the other hand, in Comparative Examples 1 to 3 in which the Young's modulus or the GSP value does not satisfy the above-described range, the ratio of the zero value area, i.e., that of points of transfer failures, exceeds 0.5% from the 1st or 10th slave medium.

What is claimed is:

1. A process of producing a magnetic recording medium having data recorded thereon, comprising the steps of:

preparing a magnetic transfer master medium comprising a non-magnetic substrate having a surface with protrusion portions and depression portions corresponding to said data;

preparing a slave medium comprising a non-magnetic support having a magnetic recording layer thereon;

initially magnetizing said magnetic recording layer of said slave medium in a predetermined direction;

bringing said surface of said master medium into intimate contact with said magnetic recording layer of said slave medium at a predetermined pressure to form a conjoined body; and applying a transfer magnetic field to said conjoined body in a direction opposite from said predetermined direction; wherein the substrate of the master carrier has a Young's modulus E (GPa) of 85 to 250, and an expression $2 \leq \alpha E d^3 / \{P(S2/S1)\} \leq 400$ (where the constant $\alpha = 7.37 \times 10^9$) is satisfied, where d (m) is a thickness of the substrate of the master carrier from a bottom face of a recessed portion to a back face, S1 (m²) is a total area of cross sections of projected portions which are parallel to a plane of the substrate at a height of 50% of Dmax from the bottom face of the recessed portion when a height from the bottom face of the recessed portion to a top face of a projected portion is denoted by Dmax, S2 (m²) is a total area of bottom faces of recessed portions and cross sections of the projected portions at a position of the relevant bottom faces, and P (MPa) is the predetermined pressure.

2. A magnetic transfer device comprising:

a magnetic transfer master carrier including a substrate having a projected/recessed pattern on a surface thereof, the projected/recessed pattern being formed in accordance with information to be transferred to a recording medium;

tight contact means for bringing the magnetic transfer master carrier and the recording medium into tight contact with each other with a predetermined pressure; and magnetic field application means for applying a magnetic field to the recording medium and the master carrier, which have been brought into tight contact with each other by the tight contact means, and transferring the information to the recording medium, wherein the substrate of the master carrier has a Young's modulus E (GPa) of 85 to 250, and an expression $2 \leq \alpha E d^3 / \{P(S2/S1)\} \leq 400$ (where the constant $\alpha = 7.37 \times 10^9$) is satisfied, where d (m) is a thickness of the substrate from a bottom face of a recessed portion to a back face, S1 (m²) is a total area of cross sections of projected portions which are parallel to a plane of the substrate at a height of 50% of Dmax from the bottom face of the recessed portion when a height from the bottom face of the recessed portion to a top face of a projected portion is denoted by Dmax, S2 (m²) is a total area of bottom faces of recessed portions and cross sections of the projected portions at a position of the relevant bottom faces, and P (MPa) is the predetermined pressure.

3. The magnetic transfer device according to claim 2, wherein the master carrier has a ratio S2/S1 between the total areas S1 and S2 in a range of 2 to 100.

4. The magnetic transfer device according to claim 2, wherein the master carrier has the thickness d in a range of 0.05 to 0.71 mm.

5. The magnetic transfer device according to claim 2, wherein, in the master carrier, the substrate is made of any one of Ni and alloy containing Ni as a main component.

6. The process as defined in claim 1, wherein said substrate of the master carrier has a Young's modulus of 150 to 230.

7. The process as defined in claim 1, wherein said substrate satisfies the expression: $150 \leq \alpha E d^3 / \{P(S2/S1)\} \leq 350$.

8. The process as defined in claim 1, wherein P ranges from 0.05 to 9.0 MPa.

9. The process as defined in claim 1, wherein P ranges from 0.06 to 7.0 MPa.

10. The process as defined in claim 1, wherein said thickness d ranges from 0.05 to 0.71 mm.

11. The process as defined in claim 1, wherein said substrate is made of Ni or a Ni alloy.

12. The process as defined in claim 1, wherein said master further comprises a soft magnetic layer on said surface.

13. The process as defined in claim 12, wherein said soft magnetic layer comprises Co, a Co alloy, Fe, a Fe alloy, Ni, or a Ni alloy.

14. The process as defined in claim 12, wherein said soft magnetic layer comprises FeCo or FeCoNi.

15. The process as defined in claim 1, wherein said protrusion portions of said master carrier have heights in a range from 50 to 800 nm.

16. The process as defined in claim 1, wherein said protrusion portions of said master carrier have heights in a range from 80 to 600 nm.

17. The process as defined in claim 1, wherein said master carrier further comprises a protective film of a diamond like carbon.

18. The process as defined in claim 17, wherein said protective layer has a thickness in a range from 5 to 30 nm.

19. The process as defined in claim 1, wherein said slave medium comprises a thin metallic magnetic film comprising Co, a Co alloy, Fe, or a Fe alloy.

20. The process as defined in claim 19, wherein said slave medium further comprises a non-magnetic sub layer comprising Cr, CrTi, CoCr, CrTa, CrMo, NiAl, Ru, or Pd, under said thin metallic magnetic film.

* * * * *